Feb. 28, 1956  H. W. IBBOTT  2,736,199
APPARATUS RESPONSIVE TO MULTIPLE FLUID PRESSURES
Filed July 17, 1950  3 Sheets-Sheet 1

Inventor:
Harold William Ibbott;
By his attorneys,
Baldwin & Wight

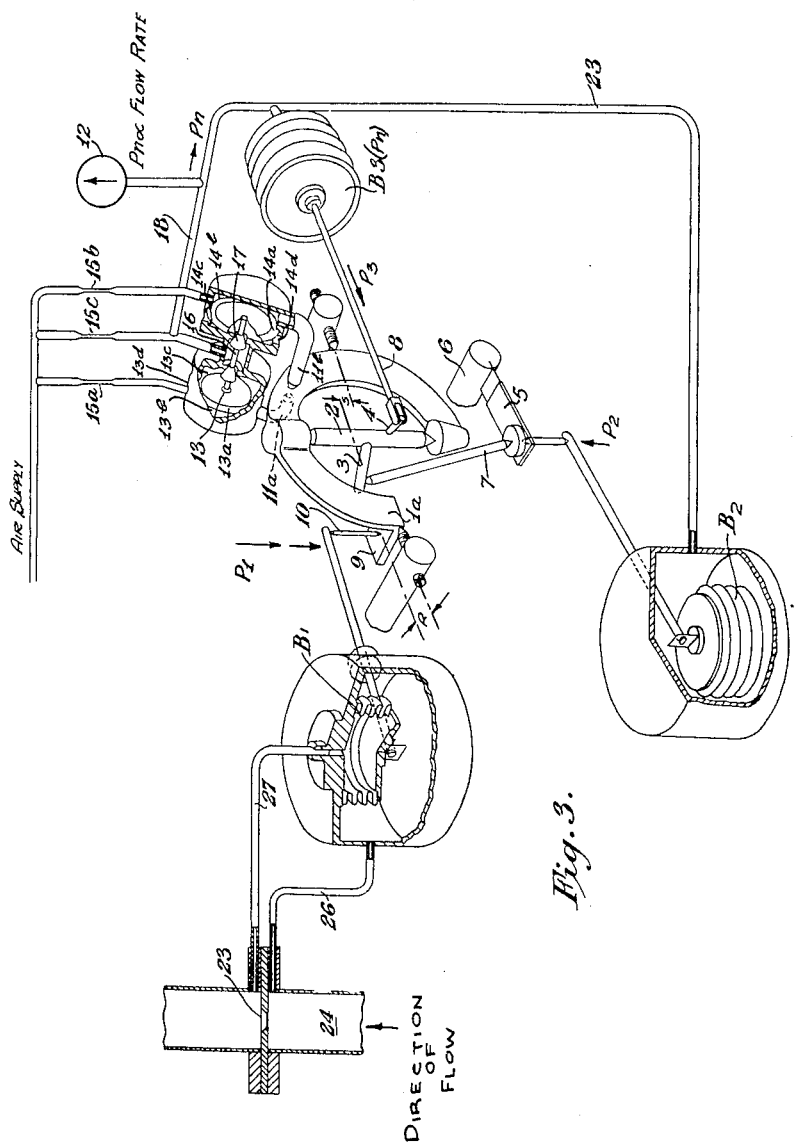

United States Patent Office 2,736,199
Patented Feb. 28, 1956

2,736,199

APPARATUS RESPONSIVE TO MULTIPLE FLUID PRESSURES

Harold William Ibbott, London, England, assignor to Negretti & Zambra Limited, London, England, a company of Great Britain Application July 17, 1950, Serial No. 174,154

Claims priority, application Great Britain November 29, 1949

7 Claims. (Cl. 73—205)

The invention relates to apparatus which is particularly adapted to measure, and possibly effect a control thereby the product or quotient of two variables or of one variable and an invariable, the square of a single variable, or the square-root of a single variable.

The apparatus, according to the invention, is adapted to be actuated in dependence upon three factors and it comprises a pivoted member, means for applying one force (say $P_1$), dependent on one factor, to the pivoted member at a set distance from the pivot axis thereof so as to give it a torque in one direction about its pivot axis, means for applying a second force (say $P_2$), dependent on a second factor, to the pivoted member so as to give it a torque in the other direction, means actuated by a third force or a displacement (say $P_3$, herein termed a force), dependent on a third factor, for varying the distance between the point of application of force $P_2$ and the pivot axis of the pivoted member, and means actuated by pivotal displacement of the pivoted member about its pivot axis to control the torque-relationship between the three forces so as to counteract said pivotal displacement and maintain the pivoted member in equilibrium.

In the preferred form of the device, the latter-mentioned means comprises a fluid pressure system adapted to control any one of said forces or both forces $P_2$ and $P_3$ and a fluid escape nozzle in said system adapted to be controlled by any pivotal displacement of the pivoted member.

The pivoted member may comprise a spindle rotatable about its longitudinal axis which is at right angles to the pivot axis of the member, a strut projecting from the spindle and adapted to be acted upon by $P_2$ in such a way that no component of that force causes the spindle to rotate, and a second strut projecting from the spindle and adapted to be acted upon by $P_3$ in a direction substantially at right angles to the longitudinal axis of the spindle. The two struts are preferably substantially at right angles to one another in order to obtain the maximum accuracy possible.

Figure 1:
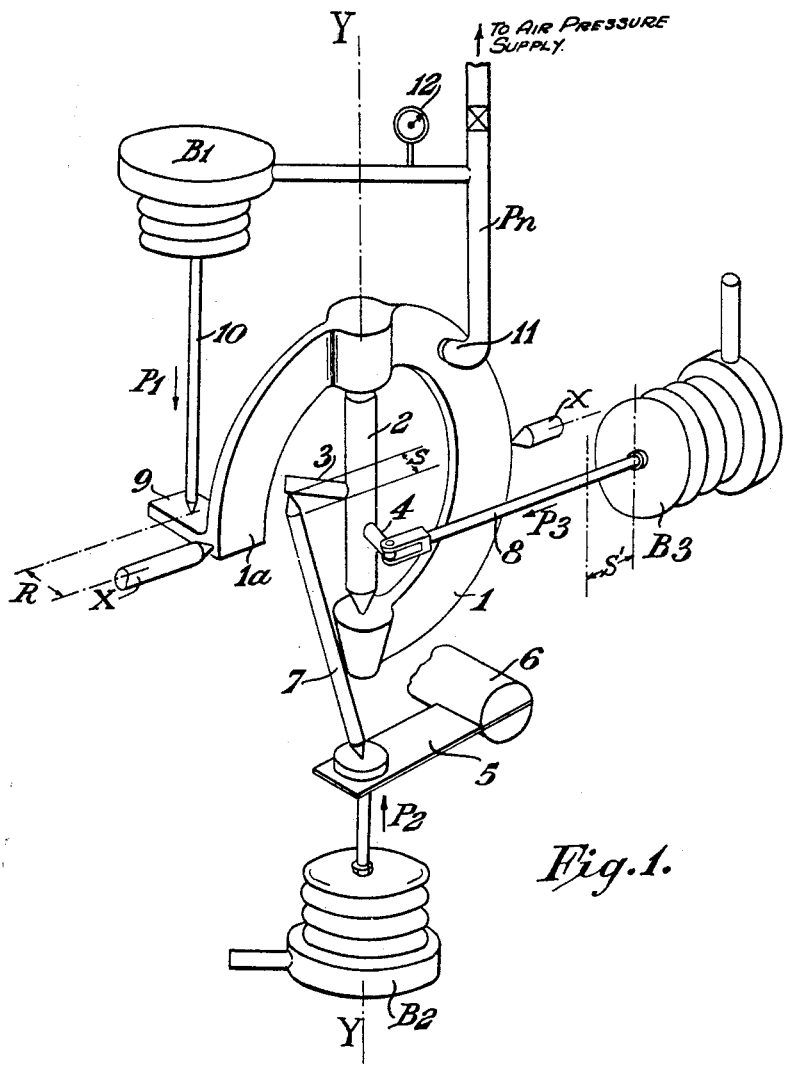
Figure 2:
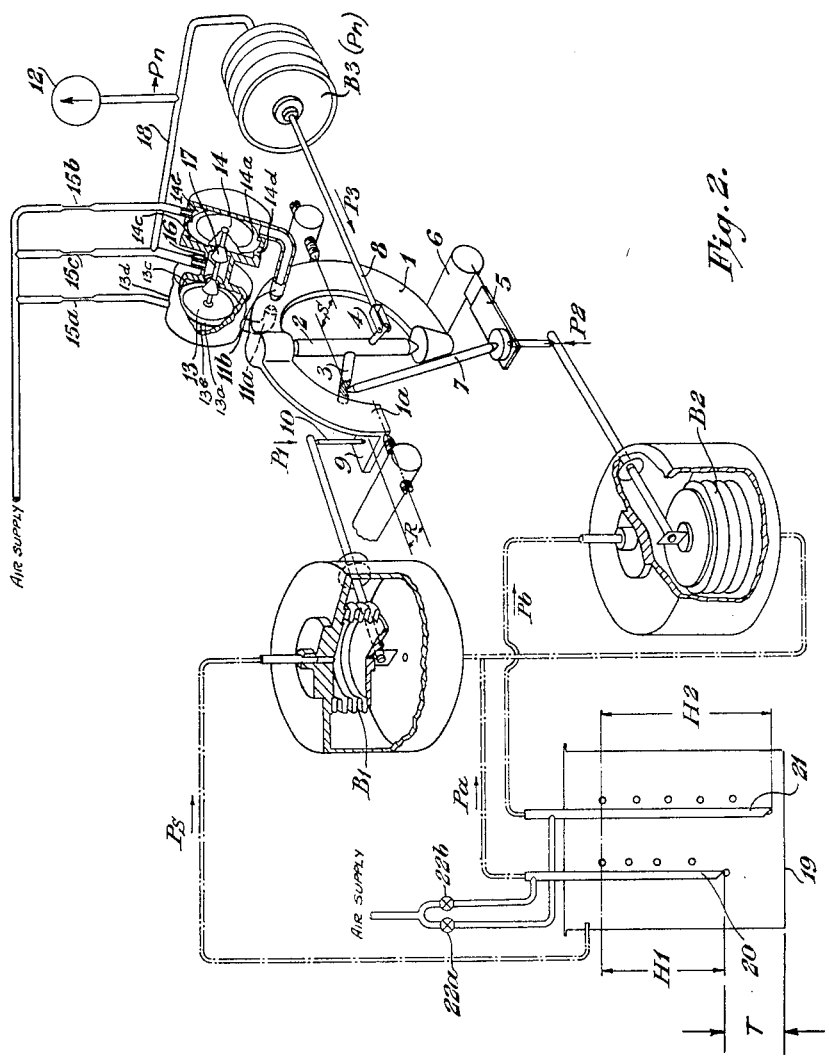

The invention is illustrated by the accompanying drawings in which:

Fig. 1 is a perspective view of the main parts of an apparatus according to the invention, Fig. 2 shows the same in greater detail, slightly modified and adapted for use in measuring a liquid depth, and Fig. 3 shows a similar apparatus to that shown in Fig. 2 but adapted to measure air flow on a linear scale.

In Figure 1, a ¾-annular member 1 is pivoted about an axis XX on which lies one end 1a of the member. A rotatable spindle 2 whose axis YY is at right angles to the axis XX is held within the space enclosed by the member 1 and pivoted thereto, and is provided with two arms, 3 and 4, projecting therefrom substantially at right angles to each other. The aforementioned force $P_2$ acts on a strip of flexible material 5 which is supported by a projection 6 of an outside framework and to which is pivotally connected a push rod 7 the pivotal connection being in the line of the axis YY of the rotatable spindle. The push rod 7 is also pivotally connected at the other end to the arm 3. Another push rod 8 is pivotally connected to the arm 4 and is adapted to be actuated by the aforementioned force $P_3$ whereby the spindle 2 may be rotated and the torque exerted by $P_2$ on the member 1 may be varied.

Formed in the end 1a of the member 1 is a flange 9 projecting at right angles to the plane of the member. A push rod 10 is connected to the flange 9 at a set distance from the plane of the member and is adapted to be actuated by the aforementioned force $P_1$ so as to give a torque to the member 1 in the reverse direction to that exerted by $P_2$.

An air pressure supply has an air escape nozzle 11 disposed in close proximity to a point of the member 1 remote from the pivot axis XX thereof in such a way that the air escape is regulated by displacement of said member. The three forces $P_1$, $P_2$ and $P_3$ are derived respectively from movements of three air bellows or capsules $B_1$, $B_2$ and $B_3$.

In the general working of the device, any one of the three bellows or both bellows $B_2$ and $B_3$ may be fed by the air pressure as regulated by the nozzle, measured by the gauge 12 and herein termed $P_n$, and the nozzle is disposed on that side of the member which will enable it to maintain equilibrium of the member. In the particular form shown in Figure 1, however, the pressure $P_n$ feeds the bellows $B_1$ and the torque due to $P_1$ will tend to move the member 1 away from the nozzle 11 thereby decreasing the pressure $P_n$, and hence the pressure in $B_1$.

In addition the single bellows or both bellows not fed by $P_n$ are actuated by air pressure which is regulated by a variable factor or factors. Also, in some applications of the invention, a bellows not actuated by either $P_n$ or a variable factor may be connected to a constant air pressure supply or alternatively be replaced by any other means which would give a force which might be constant at any preset value.

In the following examples, which illustrate the uses of the above described apparatus, the set distance of the application of force $P_1$ from the plane of the member 1 is denoted by $R$, and the distance of the application of force $P_2$, via the push rod 7 from the plane of the member 1 is denoted by $s$. Since the two arms 3 and 4 are at right angles to each other $s$ is proportional to the displacement $s'$ of or due to the force $P_3$. This displacement $s'$ is itself proportional to force $P_3$ and hence the distance $s$ is proportional to force $P_3$. Thus, considering the member 1 in equilibrium $$P_1 R = P_2.s$$

but, $$s = k.P_3, \text{ where } k = \text{constant}$$

therefore, $$P_1 R = k.P_2.P_3$$

or, $$P_1 \alpha P_2.P_3$$

Example 1.—To measure the product of two variables

The bellows $B_1$ is fed by the pressure $P_n$ and the bellows $B_2$ and $B_3$ are fed respectively by air pressures controlled by two variable factors. $P_1$ will then be so controlled as to maintain equilibrium of the member, and $$P_1 \alpha P_2 \cdot P_3.$$

In this case, the gauge 12 will be used to give a measurement of the product of two variables.

*Example 2.—To measure the square of a single variable*

The bellows $B_1$ is fed by the pressure $P_n$ and the bellows $B_2$ and $B_3$ are both fed by a single air pressure which is controlled by a single variable factor. Then, $$P_2 = P_3$$

and, $$P_1 \alpha P_2^2$$

or, $$P_1 \alpha P_3^2$$

In this case, the gauge 12 connected to pressure $P_n$ in bellows $B_1$ will be used to give a measurement of the square of a single variable.

*Example 3.—To measure the quotient of two variables*

The bellows $B_3$ is fed by the pressure $P_n$, the nozzle now being on the reverse side of the pivotable member as above explained in order to maintain equilibrium, and $B_1$ and $B_2$ are fed respectively by air pressures controlled by two variable factors. Equilibrium of the member will be maintained by the automatic regulation of $P_3$ and, $$P_3 = P_1 R / P_2 k$$

or, $$P_3 \alpha P_1 / P_2$$

In this case, the gauge 12 connected to the pressure $P_n$ in bellows $B_3$ will be used to give a measurement of the quotient of two variables.

*Example 4.—To measure the square root of a single variable*

Bellows $B_2$ and $B_3$ are both fed by $P_n$ and bellows $B_1$ is fed by air pressure controlled by a variable factor. Then, $$P_2 = P_3$$

therefore, $$P_2^2 \alpha P_1$$

and, $$P_2 \alpha \sqrt{P_1}$$

or, $$P_3 \alpha \sqrt{P_1}$$

In this case, the gauge 12 connected to the pressure $P_n$ in bellows $B_2$ and $B_3$ will be used to give a measurement of the square root of a single variable.

In the practical application of the invention, it is advisable to counteract the force on the pivoted member caused by the pressure of air escaping from the nozzle and a suitable means for effecting this counteraction is contained in the apparatus shown in Figure 2.

In Figure 2, the apparatus contains the same main parts as shown in Figure 1 except that the pressure $P_n$ is adapted to feed the bellows $B_3$ as in Example 3 above, and two nozzles 11a and 11b are used instead of the nozzle 11. The nozzles 11a and 11b are disposed one on each side of the member 1 and operate an air relay comprising two chambers 13 and 14 divided respectively by diaphragms 13a and 14a into compartments 13b and 13c, and 14b and 14c. The compartments 13b and 14b are connected respectively to the nozzles 11a and 11b and to an air-pressure supply through constrictions 15a and 15b. Compartments 13c and 14c are provided respectively with apertures 13d and 14d to atmosphere. A third chamber 16 is connected to and disposed between compartments 13c and 14c, the two connections being controlled together and at the same time by a two-headed valve 17 which is connected to the diaphragms 13a and 14a and hence adapted to be opened by excess pressure in compartment 14b and closed by excess pressure in compartment 13b. The third chamber 16 is also connected to the air pressure supply through a constriction 15c and to the bellows $B_3$ via a pipe 18. The air pressure in the third chamber 16 will thus be the said pressure $P_n$ and is measured by the gauge 12.

Under normal conditions of equilibrium, the valve 17 is slightly open and the pressure $P_n$ remains constant having a continual bleed of pressure through both nozzles 11a and 11b to atmosphere through 13d and 14d. When the pressure in compartment 13b is increased by movement of the member 1 towards the nozzle 11a and the pressure in compartment 14b is reduced by movement of the member 1 away from the nozzle 11b, the valve 17 is closed and pressure $P_n$ will rise, no longer having a bleed. $P_n$ will then give the bellows $B_3$ an increased force in order to counteract the movement of the member 1. When the pressure in compartment 14b is increased and the pressure in compartment 13b reduced by reverse movement of the member 1 the valve 17 opens wide and pressure $P_n$ is reduced thus reducing the force exerted by the bellows $B_3$. The pressure difference required to operate the relay is extremely small, and in the balance there will be no resultant force exerted on 1 from the nozzles 11a and 11b.

An enclosed tank 19 contains the liquid whose depth is to be measured and this measurement is effected by computing the quotient of two variables, as described in Example 3. The two variables are derived respectively from two pipes 20 and 21 depending into the liquid to different depths, the pipe 20 being the shallower. $H_1$ indicates the depth reached by pipe 20 and $H_2$ indicates the depth reached by pipe 21. Both pipes 20 and 21 are fed at the top, through constrictions 22a and 22b, with air pressure which forces the water out of the inside of the pipes and bubbles out of the ends, as shown in Figure 2. The air pressure required to force the water out of the shallower pipe 20 will naturally be smaller than that required to force the water out of the deeper pipe 21 and the air pressure (say $P_a$) in the pipe 20 will therefore be smaller than the pressure (say $P_b$) in pipe 21. Pressure $P_a$ feeds one side of bellows $B_1$ and also one side of bellows $B_2$ such that in the former case it will tend to increase $P_1$ and in the latter case it will tend to decrease $P_2$. The static pressure (say $P_s$) at the top of the liquid in the tank, produced primarily by the air supply, feeds the other side of bellows $B_1$ and the pressure $P_b$ feeds the other side of bellows $B_2$. The pressure at the top of the tank will increase if air is supplied at a pressure greater than $P_a$ (or $P_b$ as the case may be) plus the original (for instance, atmospheric) pressure at the top of the tank. Pressure at the top of the tank cannot be increased beyond the value given by subtracting $P_b$ from the air supply pressure.

The force $P_1$ is thus equal to $(P_a - P_s)$ and the force $P_2$ equal to $(P_b - P_a)$. $P_3$ is, in this case, the force to be measured, therefore $$P_3 = P_1 / P_2 = (P_a - P_s) / (P_b - P_a)$$

Letting the density of the liquid be "$d$", $$P_a = H_1 \times d + P_s$$
$$P_b = H_2 \times d + P_s$$
$$\therefore P_3 = (H_1 \times d) / d(H_2 - H_1) = H_1 / H_2 - H_1$$

Now $(H_2 - H_1)$ is known and so is the distance (say T) of the bottom of pipe 20 from the bottom of the tank 19. Thus the depth of liquid in the tank can readily be determined independently of change of the liquid density by reading the value of $H_1$ on a linear scale on gauge 12 operated by $P_3$, and adding to this value the distance "T".

In Figure 3 the measuring apparatus is the same as that shown in Figure 2 except that only one side of the bellows $B_2$ is fed with air pressure and the pressure $P_n$ in this case feeds both bellows $B_2$ and $B_3$, the former via a pipe 23. The apparatus is thus adapted to measure the square root of a singe variable as in Example 4 above.

The apparatus according to Figure 3 is adapted to measure the flow of air in a pipe 24 the direction of flow being as indicated. A constriction 23 is provided in the pipe 24 and the differential pressure is obtained by pipes 26 and 27 which join the pipe 24 on either side of the constriction 25 and feed either side respectively of the bellows $B_1$. The air pressure upstream of the constriction 23 will thus bear against the outside of bellows $B_1$ via pipe 26 and the pressure downstream against the inside of bellows $B_1$ via pipe 27. The force $P_1$ will thus be proportional to the differential pressure across the constriction which is itself proportional to the square of the flow. Thus, $$P_1 a (\text{Flow})^2$$

As shown in Example 4, $$P_n = (P_3 \text{ or } P_2) a \sqrt{P_1}$$

$$P_n a \text{Flow}$$

Thus the gauge 12, which measures $P_n$, can be graduated to give a linear scale measurement of the flow of air in pipe 24. By simple modification, the apparatus could of course be used to measure liquid flow.

The apparatus according to the invention may be used for many other puposes. For example, in carburetion of engines and gas turbines, the quantity of fuel injected must be proportional to temperature and pressure as well as to air volume. Therefore the apparatus may control the fuel in proportion to the air volume times the absolute pressure or to the air volume, divided by the absolute temperature. In another application, the apparatus could be used to multiply torque by speed and thus form a power meter. Displacement "$s$" may be controlled by a transmission dynamometer, and force $P_3$ and force $P_2$ may be provided by a magnet actuated by the current produced by a generator geared to the transmitting shaft.

The invention has been more particularly described with the use of air pressures operating bellows to give the forces required but this is merely a convenient method of providing the forces and other methods e. g. direct mechanical linkages, might well be used.

I claim:

1. Proportionally responsive apparatus comprising a pivoted member which is in shape at least three-quarters of an annulus, an arm projecting therefrom, a bellows, a force-transmitting linkage between said bellows and said arm, a rotatable spindle mounted within the space enclosed by the pivoted member and at right angles to the pivot axis thereof, an arm carried by the spindle, a second bellows, a force-transmitting linkage between said second bellows and said arm, a second arm carried by said spindle, a third bellows, a force-transmitting linkage between said third bellows and said second arm, an air pressure system, two air escape nozzles in said system located one on each side of the pivoted member and both in close proximity thereto, and an air relay in said system connected to the nozzles and to at least one of said three bellows.

2. Proportionally responsive apparatus adapted to be actuated in dependence upon three factors, comprising a pivoted member, means responsive to one of said factors for applying a first force to said pivoted member at a set distance from the pivot axis thereof tending to apply a torque thereto in one direction about its axis, a spindle carried by said pivoted member and rotatable at right angles to the pivot axis of said pivoted member, an arm carried by said spindle, means responsive to a second of said factors for applying a second force to said arm tending to apply to said pivoted member a torque in the other direction about its pivot axis, but not to rotate said spindle, a second arm carried by said spindle, means responsive to the third of said factors for applying a third force to said second arm so as to rotate said spindle but not said pivoted member, means actuated by pivotal displacement of the pivoted member about its pivot axis to control the application of said third force to said second arm to control the torque relationship between said first and second forces so as to counteract said pivotal displacement and maintain said pivoted member in equilibrium, and a meter connected for actuation by said last-named means.

3. Apparatus as claimed in claim 2 in which said means actuated by pivotal displacement of said pivoted member comprises a fluid pressure system controlling one of said forces, and a fluid escape nozzle in said system adjacent and directed at said pivoted member whereby escape of fluid therefrom is controlled in accordance with pivotal displacement of said pivoted member.

4. Apparatus as claimed in claim 2 in which said means actuated by pivotal displacement of said pivoted member comprises a fluid pressure system including two fluid escape nozzles disposed one at each side of and directed against said pivoted member, and an air pressure relay operative in accordance with the rate of escape of fluid from the respective nozzles in accordance with the proximity thereof to said pivoted member, said relay controlling said third force.

5. Apparatus as claimed in claim 2 in which said means actuated by pivotal displacement of said pivoted member comprises a fluid pressure system including two fluid escape nozzles, disposed one at each side of and directed against said pivoted member, an air pressure supply, an air pressure relay connected to said nozzles to be operated in accordance with the rate of escape of fluid from the respective nozzles in accordance with the proximity thereof to said pivoted member, said relay controlling said third force, said relay comprising two chambers each connected to one nozzle and to said air pressure supply, said relay further comprising a third chamber connected to the third force-providing means, said third chamber being provided with a leak and a valve controlling said leak and opened by predetermined pressure in one of the two first-mentioned chambers and closed by predetermined pressure in the other of the two first-mentioned chambers.

6. Apparatus as claimed in claim 2 in which said means actuated by pivotal displacement of said pivoted member comprises a fluid pressure system including two fluid escape nozzles, disposed one at each side of and directed against said pivoted member, an air pressure supply, an air pressure relay connected to said nozzles to be operated in accordance with the rate of escape of fluid therefrom in accordance with the proximity of said nozzles to said pivoted member, said relay controlling both of said second and third forces, said relay comprising two chambers respectively connected to said nozzles and connected to said air pressure supply, said relay further including a third chamber connected to the second and third force-providing means, said third chamber having a leak aperture, and a valve controlling said leak aperture and opened by predetermined pressure in one of the two first-mentioned chambers.

7. Proportionally responsive apparatus comprising a pivoted member, a fluid-operated force-transmitter connected to apply force to the pivoted member at a set distance from the pivot axis thereof, a rotatable spindle carried by said pivoted member and at right angles to the pivot axis thereof, an arm projecting from said spindle, a second fluid-operated force-transmitter connected to apply force to said arm tending to counteract the torque produced by the first-mentioned force but not to rotate said spindle, a second arm carried by said spindle, a third fluid-operated force-transmitter connected to apply force to said second arm tending to rotate the spindle but not the pivoted member, a fluid pressure system connected to feed at least one of the three force-transmitters, said system comprising two fluid escape nozzles disposed one at each side of and directed against said pivoted member; a fluid relay comprising two chambers, one connected to one of said nozzles and the other connected to the other nozzle, both chambers being connected to a fluid pressure supply through a constriction, and a third chamber connected to both of said two chambers, to an air pressure supply through a constriction and to at least one of the three said force-transmitters.

References Cited in the file of this patent

UNITED STATES PATENTS

| | | |
|---|---|---|
| 2,065,702 | Hubbard | Dec. 29, 1936 |
| 2,217,642 | Luhrs | Oct. 8, 1940 |
| 2,223,712 | Ziebolz | Dec. 3, 1940 |
| 2,296,714 | Ibbott | Sept. 22, 1942 |
| 2,305,070 | Butler | Dec. 15, 1942 |
| 2,354,423 | Rosenberger | July 25, 1944 |
| 2,396,279 | Metsger | Mar. 12, 1946 |